United States Patent
Xie et al.

(10) Patent No.: US 12,169,516 B1
(45) Date of Patent: Dec. 17, 2024

(54) SYSTEM AND METHOD FOR EXTRACTING CITATIONS FROM DOCUMENTS AND CONSTRUCTING ENRICHED CITATION DATABASES

(71) Applicant: Litigiven LLC, Dallas, TX (US)

(72) Inventors: Xihao Xie, Plano, TX (US); Yang Chen, Dallas, TX (US)

(*) Notice: Subject to any disclaimer, the term of this patent is extended or adjusted under 35 U.S.C. 154(b) by 0 days.

(21) Appl. No.: 18/475,162

(22) Filed: Sep. 26, 2023

(51) Int. Cl.
*G06F 16/38* (2019.01)
*G06F 16/335* (2019.01)

(52) U.S. Cl.
CPC .......... *G06F 16/382* (2019.01); *G06F 16/335* (2019.01)

(58) Field of Classification Search
CPC .............................. G06F 16/382; G06F 16/335
See application file for complete search history.

(56) References Cited

U.S. PATENT DOCUMENTS

| | | | |
|---|---|---|---|
| 8,713,031 B1 | 4/2014 | Lee | |
| 8,874,504 B2 * | 10/2014 | King | G06F 16/382 707/608 |
| 9,058,606 B1 * | 6/2015 | Tulek | G06Q 30/018 |
| 11,501,072 B1 | 11/2022 | Saura et al. | |
| 2002/0156760 A1 * | 10/2002 | Lawrence | G06F 16/382 |
| 2009/0187567 A1 | 7/2009 | Rolle | |
| 2011/0029528 A1 * | 2/2011 | Lee | G06F 40/137 707/750 |
| 2016/0267185 A1 * | 9/2016 | Armstrong | G06F 16/951 |
| 2020/0020058 A1 | 1/2020 | Stauffer | |
| 2020/0104297 A1 * | 4/2020 | Keskar | H04L 9/0637 |
| 2021/0109958 A1 | 4/2021 | Behtash et al. | |

* cited by examiner

Primary Examiner — Etienne P Leroux
(74) Attorney, Agent, or Firm — Zhong Law, LLC

(57) ABSTRACT

A system and method for identifying citations from documents and constructing an enriched citation database may include obtaining a document comprising texts, constructing pre-processing filters and citation filters and converting short citations and immediately preceding citations into full citations. The pre-processing filters may include a first set of regular expressions matching non-citation text patterns and applying the pre-processing filters to the document to remove text patterns that match at least one of the first set of regular expressions generates a pre-processed document. The citation filters may include a second set of regular expressions matching citation text patterns and context text patterns and applying the citation filters to the pre-processed document may identify one or more citations and corresponding contexts that match at least one of the second set of regular expressions. The one or more citations and corresponding contexts may then be stored in a citation database.

18 Claims, 8 Drawing Sheets

700 →

| citing_id | cited_id | cited_is_short | cited_title_verbose | cited_title | cited_reporter |
|---|---|---|---|---|---|
| 2385464465 | 7383952304 | 1 | United States v. Lopez | Id. | 443 F.3d 1280 |
| 8395932342 | 6475738583 | 1 | Planned Parenthood v. Miller | Miller | 63 F.3d 1452 |
| 1902018942 | 9584835030 | 1 | Harris v. Vasquez | Harris | 949 F.2d 1497 |

------- continued -------

| cited_court_year | seq | proposition | explanation |
|---|---|---|---|
| 10th Cir. 2006 | 52 | That case, like Smith, involved police telling the defendant to stay put. | "Okay, just hang out here for me, okay?" |
| 8th Cir. 1995 | 215 | Indeed, many of these statutes have been interpreted in a similar manner. | federal hate-crime statute |
| 9th Cir. 1990 | 76 | It is a denial of access to a psychiatrist, just as in Ake. | "ineffective psychiatric aid is no aid at all." |

*FIG. 7*

SYSTEM AND METHOD FOR EXTRACTING CITATIONS FROM DOCUMENTS AND CONSTRUCTING ENRICHED CITATION DATABASES

TECHNICAL FIELD

The present disclosure relates to document processing, and in particular to systems and methods for automatically identifying citations and corresponding context information from digital text resources and storing the citations and corresponding context information in a citation database.

BACKGROUND

Documents often include statements and citations that reference to a source (e.g., a separate authoritative document) providing support for the statements. For example, a legal document may be the citing document, and the source may be the cited document. The citations may reference primary sources such as case laws (e.g., decisions) or statutes. The case laws may be written decisions made by a court that has authority over the present issue discussed in the legal document; the statutes may be the Constitution, the United States Code (U.S.C.), the Code of Federal Regulations (C.F.R.), or any other appropriate laws and rules. The citations may be written according to a set of rules (e.g., the Bluebook®) that are followed by authors of legal documents. However, the intricacy and diversity of the forms of legal citations makes it challenging to accurately identify legal citations from within a vast amount of electronic legal documents that are now available. Citation information in electronic legal documents may be useful for downstream applications including, for example, a machine learning module, legal document search engines and legal claim valuation engines. However, current citation extraction technologies are often limited to pattern matching based on rules or machine learning, thereby producing mere identifications of the citations without any information about why the citation was included in the citing document.

BRIEF DESCRIPTION OF THE DRAWINGS

A more detailed understanding of the examples disclosed herein may be had from the following descriptions, given by way of example in conjunction with the accompanying drawings.

FIG. 7 shows a table of citations and corresponding citation contexts according to a schema for storing the citations and corresponding citation contexts in the citation database, according to an implementation of the disclosure.

DETAILED DESCRIPTION

Figure 1:
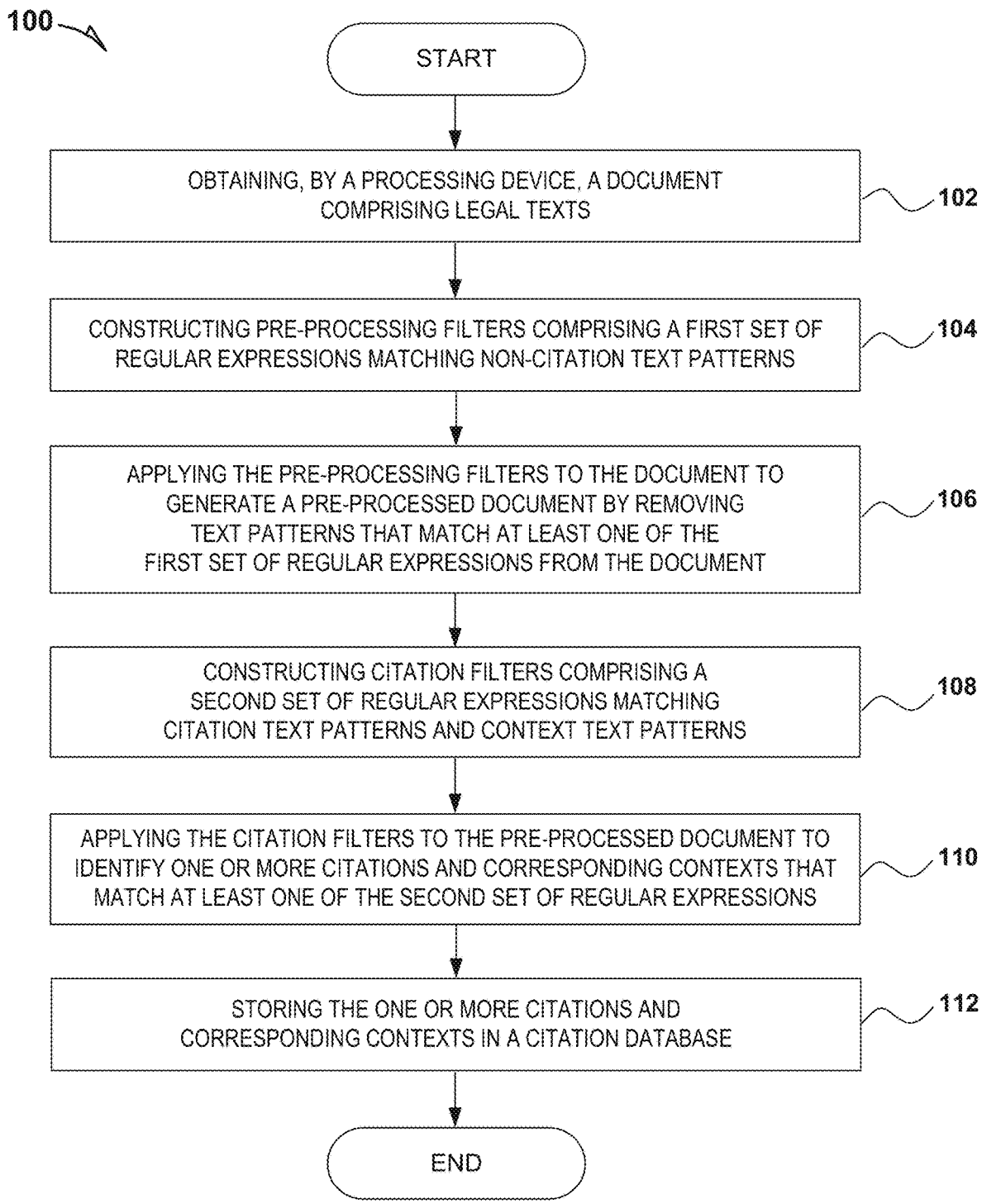
FIG. 1 shows a flow diagram of a method for identifying citations from documents and constructing an enriched citation database according to an implementation of the disclosure.

The present disclosure is illustrated by way of example, and not by way of limitation, in the figures of the accompanying drawings.

As discussed above, accurately identifying citation relationships within legal documents, distinguishing between citing and cited documents, including various primary sources such as case laws and statutes can become very complicated requiring a method for handling different citation formats according to specific rules, accommodating variations like full, short, and immediately preceding citations (e.g., Id citations). Furthermore, legal documents often contain contextual information beyond the citations themselves. Therefore, a method for extracting both citations and any corresponding citation context data and then storing both according to a schema in a citation database could form an easy to access enriched citation dataset for downstream applications, thus enhancing the performance of such applications. For example, downstream applications such as machine learning modules, legal document search engines, and legal claim valuation engines could benefit from access to accurate citation information with corresponding contextual information.

Implementations of the disclosure provide accurate citation relationship recognition—the application excels in accurately identifying citation relationships within legal documents, distinguishing between citing and cited documents, including various primary sources such as case laws and statutes; diverse citation format handling—the application's advanced capabilities are flexible for handling different citation formats according to specific rules, accommodating variations like full, short, and immediate preceding citations, enhancing possibilities for downstream applications; integration of contextual information—acknowledging that legal citations often contain contextual information beyond the citations themselves, the application extracts and stores both citation and context details, forming an enriched set of features for downstream applications, thus enhancing performance; enhancement of downstream applications—the application's outputs benefit various downstream applications such as machine learning modules, legal document search engines, and legal claim valuation engines. By providing accurate citation and contextual information, these downstream applications can operate more effectively.

Implementations of the disclosure overcome limitations of current technologies, the limitations including limited pattern matching, lack of contextual understanding, fragmented information separation, and lack of format diversity. The limited pattern matching is because current technologies heavily relied on pattern matching for citation identification, constrained to known formats and failing to adapt to evolving legal writing styles, leaving gaps in coverage. The lack of contextual understanding is because current technologies primarily focused on isolated citations, neglecting the critical context surrounding citations. Legal references often require context for accurate interpretation, necessitating improved contextual understanding. The fragmented information separation is because technologies struggled to accurately separate citation details from dependent contextual information. This could result in loss of crucial background information during citation extraction, impacting downstream application performance. The lack of format diversity is because legal documents exhibit diverse citation formats, which can evolve over time. Legacy methods might struggle to flexibly handle different formats, leading to decreased accuracy. Implementations of the disclosure effectively address the separation issues and citation format diversity.

FIG. 1 shows a flow diagram for a method 100 for identifying citations from documents and constructing an enriched citation database as described herein.

The method 100 may start and then perform the following operations. At operation 102 a processing device may obtain a document including texts of a natural language (e.g., English). For example, the document may be obtained from a repository of electronic legal documents each of which may include citations (e.g., to a legal authority). The number of electronic legal documents now available (e.g., via the internet) may result in a deluge of legal documents and invoking third-party services (e.g., AI services) to obtain legal citations and build a legal citation database could be incredibly time-consuming and/or costly. However, as explained more fully below, using regular expressions based on predefined rules of legal writing to identify legal citations and corresponding contexts may be much more efficient and precise than other methods (e.g., machine learning).

At operation 104, the processing device may construct pre-processing filters that are composed of a first set of regular expressions matching non-citation text patterns. A regular expression is a sequence of characters that specifies a match pattern in text. A regular expression may also include metacharacters that may specify how characters should be matched. Regular expressions may be used to identify text patterns (e.g., citation text patterns and citation context text patterns) or identify and remove/replace text patterns (e.g., non-citation text patterns) in a text document. Regular expressions may be implemented in different programming languages, computer executable code, and hardware logics, either directly or through libraries. Programming languages that implement regular expressions include, for example, Python, Java, JavaScript, C and C++. Although regular expressions may be created and executed using programming languages or code, some implementations may provide additions and/or variations to a basic regular expression syntax. Implementations of regular expressions in programming languages often include functions and/or methods that accept a source text (e.g., a document) and a regular expression pattern as input, and return a result based on any text strings the regular expression pattern matched in the source text. After executing the program including the pre-processing regular expression filters, the identified patterns may be replaced by blank spaces or any filtered out placeholders, thus generating the pre-processed documents which are more concise and more focused for downstream applications. Examples of two regular expressions implemented in Python for text preprocessing are provided below:

Subtitle: "\b[IVXLCDM]+\.(*[A–Za–z\.']+)*\b"

Omitted: "((([^\(\)]+omitted)|(emphasis\s+ added))\.?\)"

These two regular expressions can be embedded in a pre-processing filter to identify "subtitles" and "omitted" portions of text.

At operation 106, the processing device may apply the pre-processing filters to the document to generate a pre-processed document by removing text patterns that match at least one of the first set of regular expressions from the document. As noted above, regular expressions may be used to identify and remove text patterns, such as any non-citation text patterns in the document. It is noted that non-citation text patterns refer to certain text patterns that do not match any citation text patterns or context text patterns so that citation context information is not removed from the document before it can be extracted for a citation database as explained below. Examples of non-citation text patterns may include, but not limited to, subtitles, HTML tags, omitted symbols, footnotes, etc. The pre-processed document should be smaller than the original document and, therefore, should be much easier to search for citations and corresponding citation contexts.

At operation 108, the processing device may construct citation filters comprising a second set of regular expressions matching citation text patterns and context text patterns. There are two different kinds of citation contexts in this application, i.e., intra-citation context and inter-citation context. Intra-citation context includes statements (e.g., proposition sentence or explanatory sentences as explained more fully below) that are used to explain why a legal citation is cited. Inter-citation context may include information related to the sequential appearance of a citation (e.g., with respect to other citations) in the document. Intra-citation context text patterns can be identified by text matching with regular expressions. The identified citations with corresponding contexts will then form a sequential list of enriched citations which contain inter-citation contexts. Inter-citation contexts are determined after finding intra-citations. By storing the intra-citations in order, the inter-citation contexts are embedded in the order these intra-citations stored in the pool. The order may be used, as shown later, to convert short and/or immediate citations into full citations.

At operation 110, the processing device may apply the citation filters to the pre-processed document to identify one or more citations and corresponding contexts that match at least one of the second set of regular expressions. As noted above, regular expressions may be used to identify text patterns, such as any citation text patterns and corresponding intra-citation context text patterns in the document. More details regarding the citation filters are provided below, for example, with respect to FIGS. 6A and 6B below. Also as noted above, the pre-processed document should be smaller than the original document and, therefore, should be much easier to search for citations/corresponding contexts.

At operation 112, the processing device may store the one or more citations and corresponding contexts in a citation database. In practice, different storage mediums or databases may be used to store the data regarding the identified legal citations and corresponding contexts. For example, a traditional SQL database (e.g., MySQL) or a not-only-SQL database (e.g., Elasticsearch) may be used to save the data. Alternatively, the data may be organized and stored into a graph database (e.g., neo4j) by regarding the texts as vertices and citation relationships with identified contexts as labelled edges associating vertices. Different types of data storage mediums or databases may provide different technical advantages. For example, the preferred method for storing the citation/context data may be highly dependent on which specific downstream legal applications will access the stored data. More details regarding the schema for storing the data regarding the identified citations and corresponding contexts are provided below, for example, with respect to FIG. 7 below.

Figure 2:
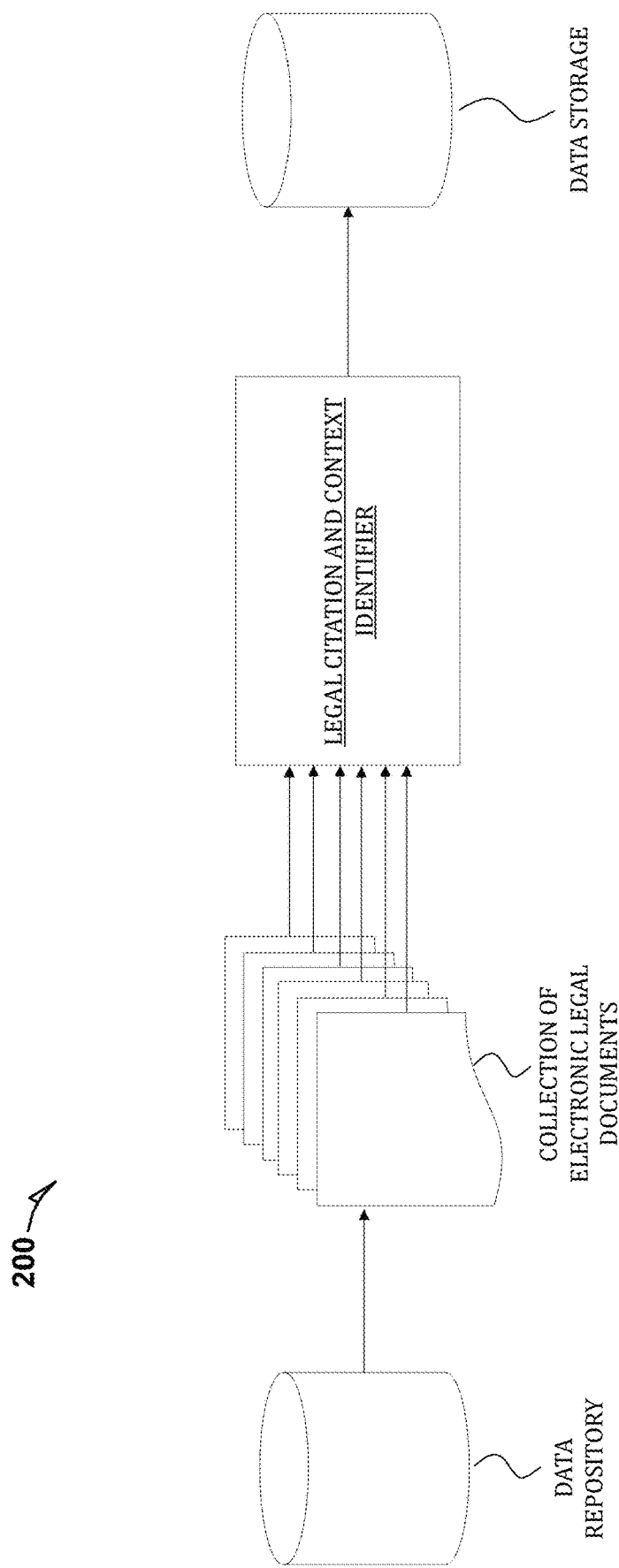
FIG. 2 shows a simple diagram of a data flow for identifying citations from documents and constructing an enriched citation database according to an implementation of the disclosure.

FIG. 2 shows a diagram of a system and data flow 200 for identifying citations from documents and constructing an enriched citation database according to an implementation of the disclosure.

The data flow 200 may begin with obtaining access to a data repository from which a collection of electronic legal documents each of which may include citations (e.g., to a legal authority) may be pre-processed/processed by filters including regular expressions for matching texts of a natural language (e.g., English). As noted above, the number of electronic legal documents now available (e.g., via the internet) may result in a deluge of legal documents.

The data flow 200 may continue with the legal citation and context identifier which may include constructing/applying the pre-processing filters composed of the first set of regular expressions matching non-citation text patterns to at least one document from the collection of electronic legal documents to generate a pre-processed document by removing text patterns that match at least one of the first set of regular expressions from the document. As noted above, the pre-processed document should be smaller than the original document and, therefore, should be much easier to search for citations and corresponding citation contexts. The legal citation and context identifier may also include constructing/applying the citation filters comprising the second set of regular expressions matching citation text patterns and intra-citation context text patterns to the at least one pre-processed document to identify one or more citations and corresponding contexts that match at least one of the second set of regular expressions.

The data flow 200 may end with storing the one or more identified citations and corresponding contexts in a citation database according to a schema in a data storage device/medium. As noted above, different storage devices/mediums or different types of databases may be used to store the data regarding the identified legal citations and corresponding contexts with the different types of data storage devices/mediums or databases providing different technical advantages that may be more or less useful depending on the situation.

Figure 3A:
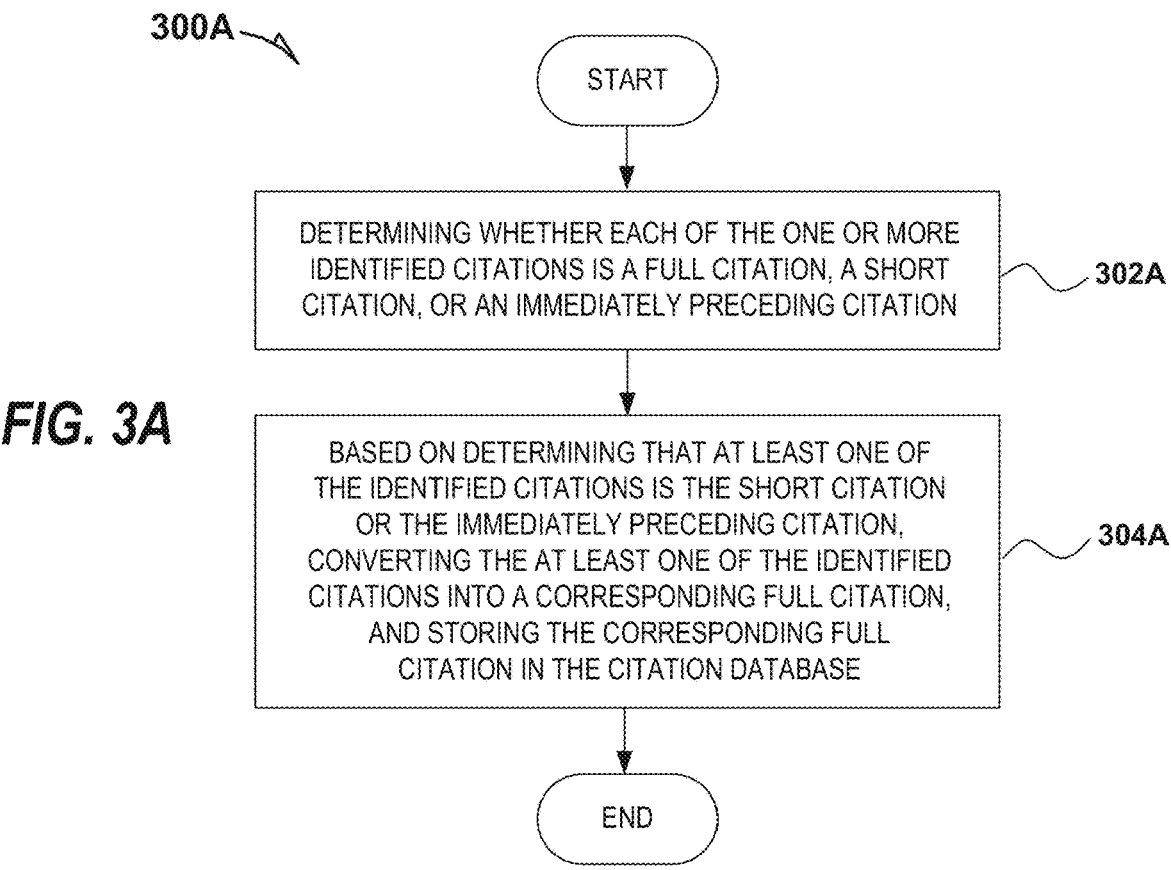
FIGS. 3A-3B show respective method flow diagrams for handling different forms of citations by converting all citations into full citations and for storing the different forms of citations in the citation database according to a schema, according to implementations of the disclosure.
Figure 3B:
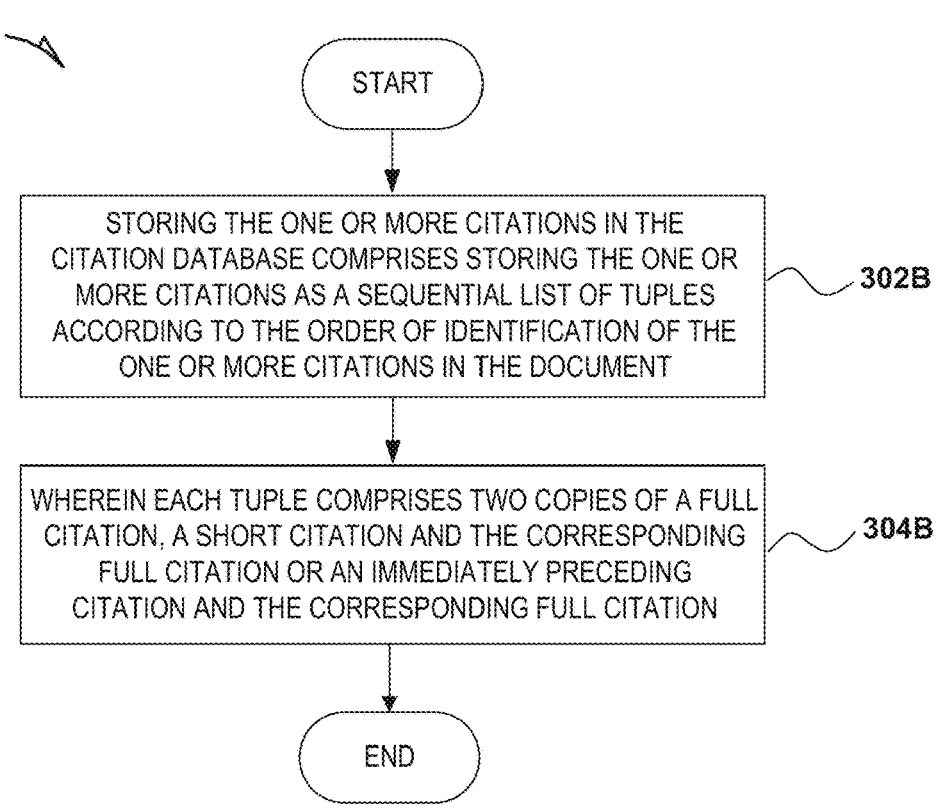

FIGS. 3A-3B show respective method flow diagrams for handling different forms of citations by converting all citations into full citations and for storing the different forms of citations in the citation database according to a schema, according to implementations of the disclosure.

FIG. 3A shows a flow diagram for a method 300A for handling different forms of citations by converting all citations into full citations as described herein. At operation 302A, the processing device may determine whether each of the one or more identified citations is a full citation, a short citation, or an immediately preceding citation. For example, a short citation may be identified by a regular expression that matches a single "party name" text pattern, an Id citation may be identified by an atomic regular expression such as I(bi)?d to match both the "Id" and "Ibid" text strings, and a full citation may be identified by a compound regular expression that matches two single "party name" text patterns.

At operation 304A, based on determining that at least one of the identified citations is the short citation or the immediately preceding citation, the processing device may convert the at least one of the identified citations into a corresponding full citation, and storing the corresponding full citation in the citation database. The converting may be accomplished based on inter-citation context information extracted from the citations that precede the short or Id citations to be converted in their sequential order of appearance in the document. As explained more fully below with respect to method 400 of FIG. 4, the Id citations may be converted by adding two party names and the short citations may be converted by adding one party name.

Converting the short or immediate citation into a full citation may be useful in real applications. For example, as discussed above, in a modern legal citation database, the citing relationships of legal resources should be stored. The premise of doing this is to make sure the uniqueness and certainty of legal resources. A specific legal resource might be cited in different forms in a single legal document or even over multiple legal documents. Sometimes, it is cited as a full citation, and it also might be cited as a short citation or an immediate citation in some situations. Thus, to identify the uniqueness and certainty of such legal citations that are cited as short citations or immediate citations, the short and immediate citations may need to be reverted into corresponding regular full citations.

FIG. 3B shows a flow diagram for a method 300B for storing citations in the citation database according to a schema as described herein. At operation 302B, the processing device may store the one or more citations as a sequential list of tuples (or database entries) according to the order of identification of the one or more citations in the document. For example, during the process of identifying legal citations, the sequential list may be augmented dynamically by appending an entry of newly identified legal citation tuples to the tail end of the sequential list.

At operation 304B, each tuple may include two copies of a full citation, a short citation and the corresponding full citation or an immediately preceding citation and the corresponding full citation. As described below with respect to method 400 of FIG. 4, for a short citation which contains only a single party name, its full citation may be located in the sequential list as the full citation of the previous identified citation (in the sequential list) which contains the singe party name and for an Id citation, its full citation may be located in the sequential list as the full citation of the latest identified citation in the sequential list.

Figure 4:
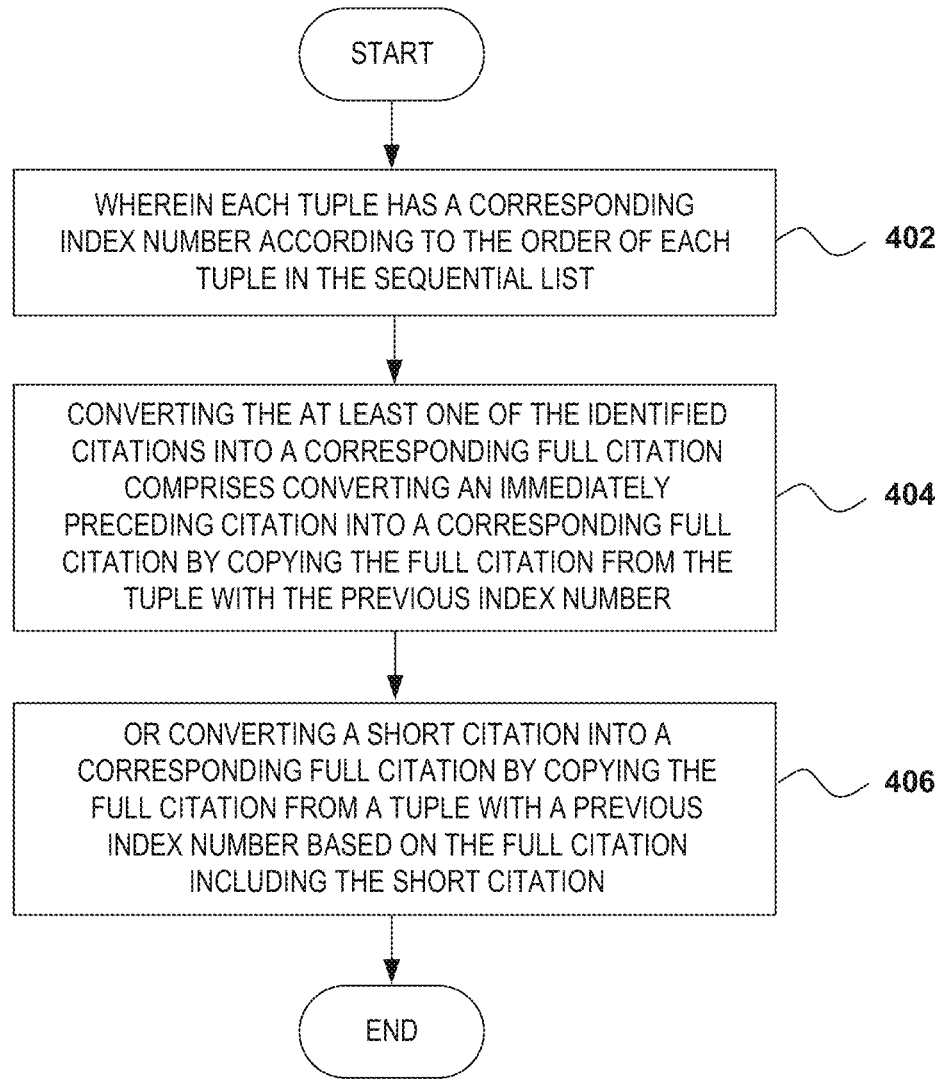
FIG. 4 shows a flow diagram of a method for converting all citations into full citations based on the schema for storing citations in the citation database according to an implementation of the disclosure.

FIG. 4 shows a flow diagram for a method 400 for converting all citations into full citations based on the schema for storing citations in the citation database as described herein.

At operation 402, each tuple has a corresponding index number according to the order of each tuple in the sequential list. For example, each entry in the sequential list may be a tuple: $<o_i, f_i>$, where the first element of the tuple, i.e., $o_i$ is the original citation text in the document, $f_i$, the second element in the tuple, is the converted full citation text of the identified citation and i is the index of the identified citation according to the order of identification in the document (and therefore also the order of addition to the sequential list). It is noted that an entry for a citation in the citation database may include many values (e.g., see FIG. 7 below) of which two of the values may be the converted full citation text and the original citation text (see both the "cited_title_verbose" and "cited_title" columns of Table 700 of FIG. 7) that are both elements of the sequential list of tuples for the citations.

Furthermore, the "seq" values refer to the sequential list index number of the citation in the citing document, for example, the last row of table 700 a citation "seq" value of "76" indicating that its index number is 76 in the sequential list for the citing document which has a "citing_id" of "1902018942". For each identified legal citation, if it is not a short citation or an immediate (or Id) citation then it is a full citation and a tuple with two identical citation texts may be appended to the tail of the sequential list. Therefore, for full citations, $f_{i+1}=o_{i+1}$ when appending a new tuple to the tail of the sequential list.

At operation 404, converting the at least one of the identified citations into a corresponding full citation comprises converting an immediately preceding citation into a corresponding full citation by copying the full citation from the tuple with the previous index number. The converting of an Id citation may be based on inter-citation context information (e.g., the sequential list index i) that may be used to find the correct full citation in the stored citation tuple for the latest identified citation. Therefore, for Id citations $f_{i+1}=f_i$ when appending a new tuple to the end of the sequential list.

At operation 406, converting a short citation into a corresponding full citation by copying the full citation from a tuple with a previous index number based on the full citation including the short citation. Based on the identified citation being a short citation, $f_{i+1}=f_k$, where k is the last index of a previously identified citation (e.g., lower value of i) wherein $o_{i+1}$ is in $f_k$, where "is in" refers to the "substring" relation meaning that the textual string of $o_{i+1}$ is a substring of $f_k$.

Accordingly, once a citation is identified, the sequential list of tuple entries will be augmented by appending $\langle o_{i+1}, f_{i+1} \rangle$ to its tail, where $o_{i+1}$ is the identified citation and $f_{i+1}$ is the converted full citation of it. A new entry of $\langle o_{i+1}, f_{i+1} \rangle$ with identified citation $o_{i+1}$ can be obtained according to the following recursive function:

$$\langle o_{i+1}, f_{i+1} \rangle = \begin{cases} \langle o_{i+1}, f_i \rangle, & \text{if } i > 0 \text{ and } o_{i+1} \text{ is an immediately preceding citation} \\ \langle o_{i+1}, f_k \rangle, & \text{if } i > 0 \text{ and } o_{i+1} \text{ is a short citation, where } k = \underset{1 \le j \le i}{\operatorname{argmax}}(o_{i+1} \text{ is in } f) \\ \langle o_{i+1}, f_{i+1} \rangle, & \text{otherwise} \end{cases}$$

Here o's represent the original citations which can be full, short, or immediate citations, and f's represent the citations that are converted into from the original citations. By executing code implementing this recursive function, an immediate citation (e.g., Id) can be converted to a full citation that is immediately prior to the immediate citation, and a short citation can be converted into a full citation that is the nearest to the short citation.

For simplicity of explanation, the operations of the methods may be depicted and described herein with a specific order. It should be appreciated, however, that these operations may occur in various orders, concurrently, and/or with other operations not presented or described herein. It is also noted that not all illustrated operations may be required to be performed.

Figure 5:
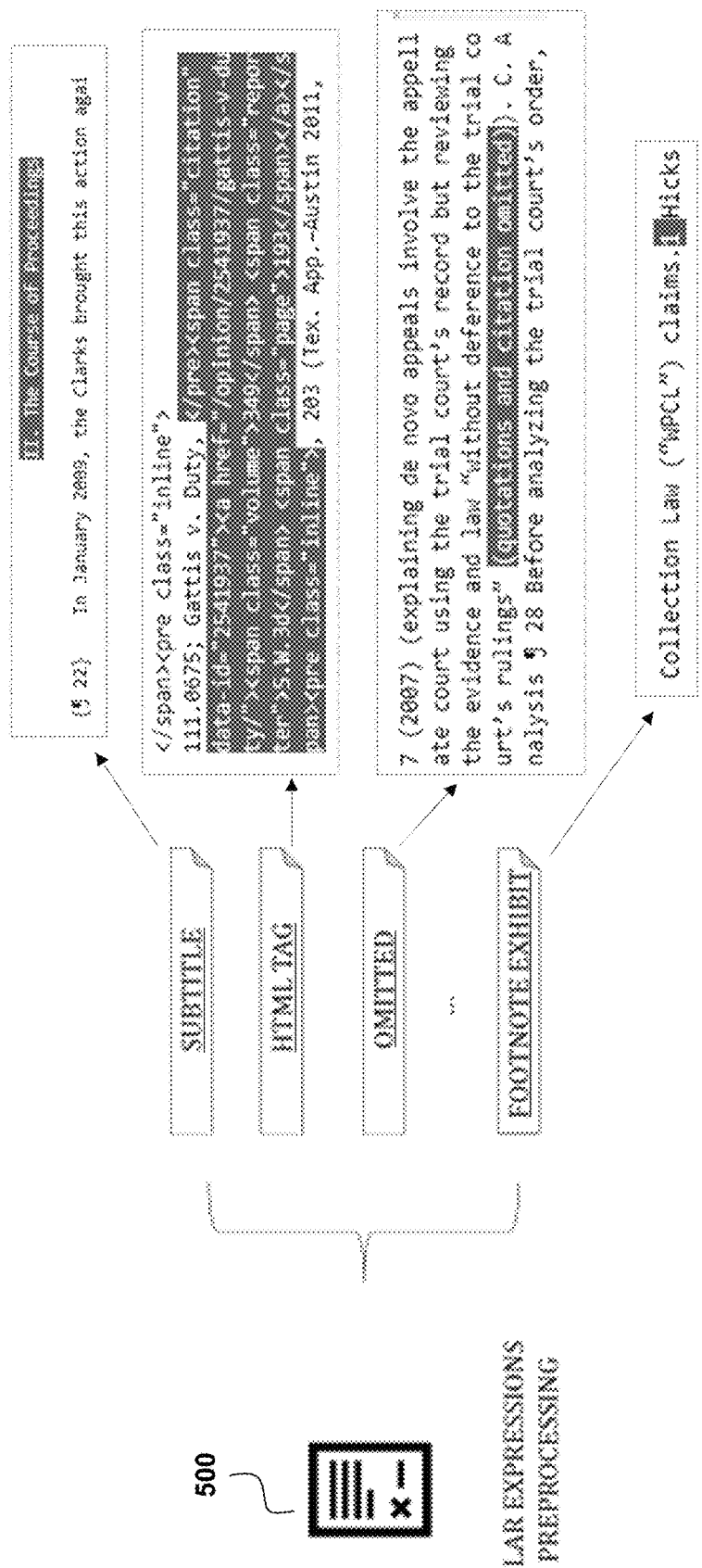
FIG. 5 shows a diagram of an example first set of regular expressions for pre-processing legal documents for citation identification according to an implementation of the disclosure.

FIG. 5 shows a simple diagram of an example first set of regular expressions 500 for pre-processing legal documents for citation identification as described herein.

As noted above, a regular expression is a sequence of characters that specifies a match pattern in text. The first set of regular expressions 500 for pre-processing legal documents may include rules-based regular expressions (e.g., atomic and/compound expressions) for matching specific non-citation text patterns, such as "subtitle" text patterns, "HTML tag" text patterns, "omitted" text patterns, and/or "footnote exhibit" text patterns. To reduce the complexity of defining and maintaining regular expressions for identifying legal citations and contexts, implementations of the disclosure introduce a method to compose regular expressions using two different kinds of expressions, i.e., atomic expressions and compound expressions. Atomic expressions are the simplest type of regular expressions that are not defined with other regular expressions; compound expressions are regular expressions that are defined by replacing placeholders with other defined regular expressions. A compound expression might be defined with one or more atomic expressions or compound expressions. In this way, it is much easier to maintain the regular expressions in practice. The pre-processing of the document with the first set of regular expressions 500 may be used to remove certain matching text patterns from the document as shown in FIG. 5 where the highlighted portions of text from the document could then be removed to create the pre-processed document for citation/context extraction. In some implementation, the non-citation text patterns to be removed are those prompts (e.g., subtitles, HTML tags, omitted quotes and citations, and footnotes) that are known not to be part of any citation or context. Some examples of the second set of atomic regular expressions are provided in the following:

FOOT_NOTE: "(f?n\.\s*\d+)"

MINUS: "([—])"

AT: "(at)"

Here, "FOOT_NOTE" is the atomic regular expression for matching foot notes in a citation; "MINUS" is the atomic regular expression for matching the minus sign; "AT" is the atomic regular expression for matching the at sign. Some examples of the second set of compound regular expressions are provided in the following:

SINGLE_PAGE: "(\d+(\s+\&?\s+{FOOT_
    NOTE})?)"="(\d+(\s+\&?\s+(f?n\.s*\d+))?)"

PAGE_RANGE: "(\d+\s*{MINUS}\s*\d+)"=
    "(\d+\s*([—])\s*\d+)"

PIN_CITE: "({AT}?\s+
    ({PAGE_RANGE}|{SINGLE_PAGE}))"=
    "((at)?\s+((\d+\s*([—])\s*\d+)|(\d+(\s+\&?\s+
    (f?n\.\s*\d+))?)))"

For each compound regular expression, it can be defined with placeholders enclosed by curly braces which can be fill with the other defined regular expressions. Here, "SINGLE_PAGE" is a compound regular expression (including an atomic regular expression FOOT_NOTE) for matching a single page in a citation; "PAGE_RANGE" is a compound regular expression (including an atomic regular expression MINUS) for matching page ranges in a citation; "PIN_CITE" is a compound regular expression (including other compound regular expressions "PAGE_RANGE" and "SINGLE_PAGE") for matching pin cites in a citation. Thus, complex compound regular expressions can be conveniently constructed from atomic regular expressions and/or other compound regular expressions.

Figure 6A:
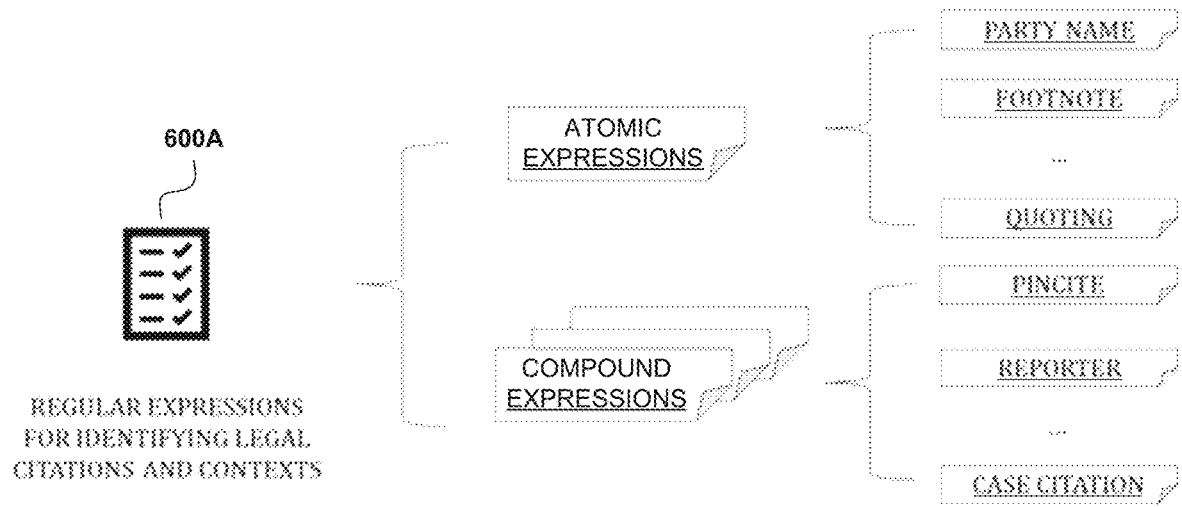
FIGS. 6A-6B respectively show a diagram of an example second set of regular expressions for identifying legal citations and corresponding contexts in the pre-processed documents and an example of the identified information in the documents, according to an implementation of the disclosure.
Figure 6B:
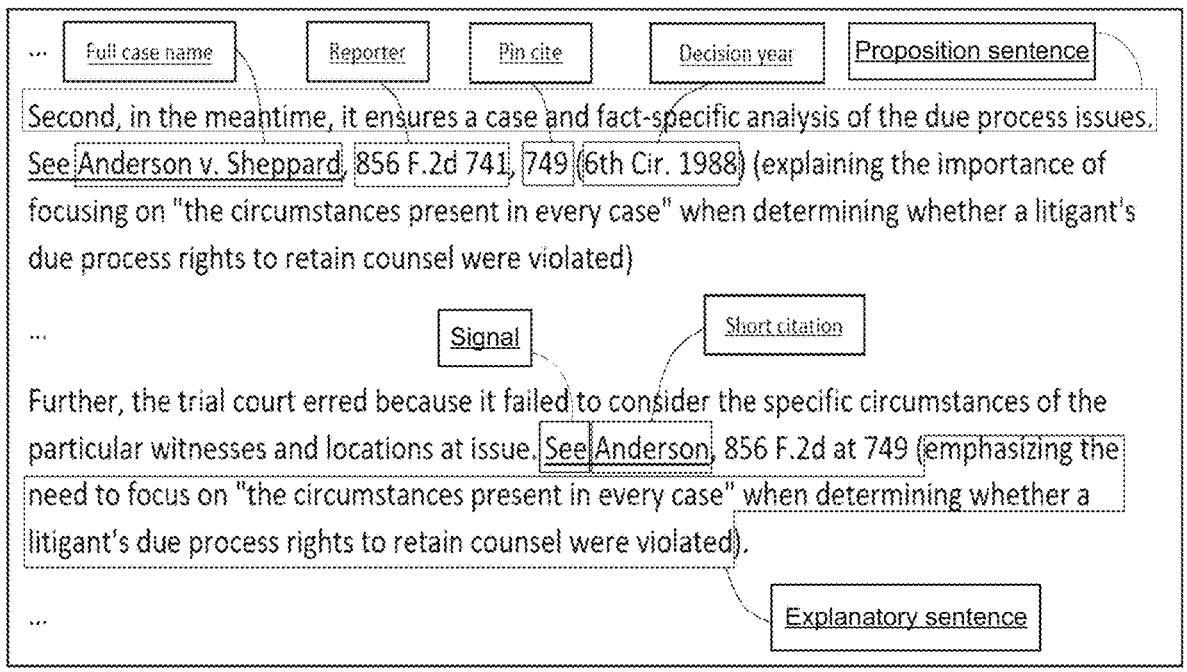

FIGS. 6A-6B respectively show a diagram of an example second set of regular expressions 600A for identifying legal citations and corresponding contexts in the pre-processed documents and an example of the identified information in the documents, as described herein.

FIG. 6A shows the second set of regular expressions 600A for citations and corresponding citation context in legal documents that may include rules-based regular expressions (e.g., atomic and/compound expressions) for matching specific citation text patterns and context text patters, such as "party name" text patterns, "footnote" text patterns, "quoting" text patterns, "pin cite" text patterns, "reporter" text patterns and/or "case citation" text patterns. In some embodiments, intra-citation context corresponding to a legal citation may also contain two particular sentence text patterns: the proposition sentence being supported and followed by a legal citation and the explanatory statement appearing after the legal citation in a pair of parentheses. The processing of the pre-processed document with the second set of regular expressions 600 may be used to identify any matching text patterns from the document as shown in FIG. 6B and described below.

FIG. 6B shows identified citation text patterns and context text patterns in the document after the processing of the pre-processed document with the second set of regular expressions 600 A. There are two legal citations in this text snippet from the pre-processed document. The first citation is a full case citation "Anderson v. Sheppard, 856 F.2d 741, 749 (6th Cir. 1988)" and the second citation is a short case citation "Anderson, 856 F.2d at 749." As shown, the two citations (e.g., one "full case name" and one "short citation") were identified together with corresponding context information. The full citation "Anderson v. Sheppard" has corresponding context including "reporter", "pin cite", "decision year" and a "proposition sentence". It should be noted that the context corresponding to the full citation would also include the explanatory sentence that follows the citation in between parentheses that is not shown as identified for clarity since an explanatory sentence is shown with respect to the second short citation. The short citation "Anderson" has corresponding context including "signal" and an "explanatory sentence". It should be noted that the context corresponding to the short citation would also include a "reporter", "pin cite" and a proposition sentence that precedes the citation that are not shown as identified for clarity since these contexts are shown with respect to the first full citation.

Each context may match several text patterns, for example the "signal" context could match the non-exhaustive list of entries in Table 1 below.

TABLE 1

| E.g., | See also | But see |
| Accord | Cf. | But cf. |
| See | Contra | See generally |

FIG. 7 shows table 700 of citations and corresponding citation contexts according to a schema for storing the citations and corresponding citation contexts in the citation database, as described herein.

Table 700 shows stored citation entries (including corresponding citation context data) in the citation database according to a schema that includes columns for values of "citing_id", "cited_id", "cited_is_short" which may refer to both short citations and Id citations, "cited_title_verbose" which refers to the full citation, "cited_title" which refers to the original citation text in the document, "cited_reporter", "cited_court_year" and "seq" which refers to the sequential list index number of the citation in the citing document. For example, the first row of table 700 indicates that the citation is "short" because it is an Id citation and its index number is 52 in the sequential list for the citing document which has a "citing_id" of "2385464465".

The citation context data in the citation entry in the citation database may be stored according to a schema that may include columns in table 700 for any of the contexts described above with respect to FIGS. 6A and 6B. In the example of table 700, columns for values (e.g., text strings) of "proposition" and "explanation" sentences are shown. For example, the last row of table 700 indicates that the citation "Harris v. Vasquez" may have been cited because "ineffective psychiatric aid is no aid at all".

Figure 8:
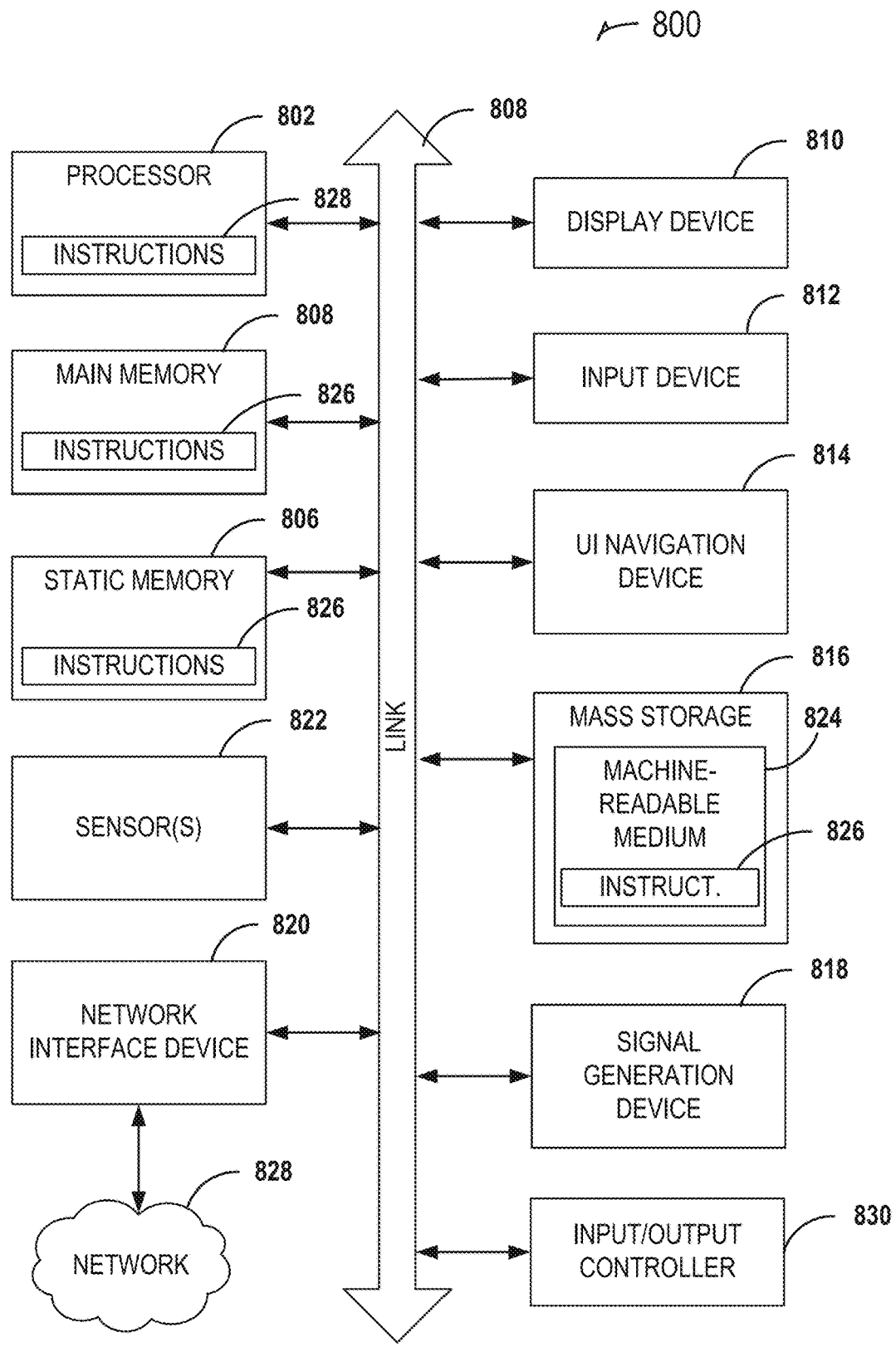
FIG. 8 is a block diagram illustrating a computer system, within which a set or sequence of instructions may be executed to cause the system to perform any one of the methodologies discussed herein.

FIG. 8 is a block diagram illustrating a computer system 800, within which a set or sequence of instructions may be executed to cause the system to perform any one of the methodologies discussed herein.

The computer system 800 may operate as a standalone device or may be connected (e.g., networked) to other systems. In a networked deployment, the computer system 800 may operate in the capacity of either a server or a client in server-client network environments, or it may act as a peer in peer-to-peer (or distributed) network environments. The computer system 800 may be an onboard vehicle system, wearable device, personal computer (PC), a tablet PC, a hybrid tablet, a personal digital assistant (PDA), a mobile telephone, or any machine(s) capable of executing instructions (sequential or otherwise) that specify actions to be taken by the machine(s). Furthermore, while only a single system is illustrated, the term "system" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein (e.g., the methods 100-400 of FIGS. 1-4).

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors 822, such as a global positioning system (GPS) sensor, accelerometer, gyrometer, magnetometer, or other such sensor.

The storage device 816 includes a machine-readable medium 824 on which is stored one or more sets of data structures and instructions 826 (e.g., software) embodying or utilized by any one or more of the methodologies or functions described herein. The instructions 826 may also reside, completely or at least partially, within the main memory 804, static memory 806, and/or within the processor 802 during execution thereof by the computer system 800, with main memory 804, static memory 806, and the processor 802 comprising machine-readable media.

While the machine-readable medium 824 is illustrated in an example embodiment to be a single medium, the term "machine-readable medium" may include a single medium or multiple media (e.g., a centralized or distributed database, and/or associated caches and servers) that store the one or more instructions 826. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 826 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 16G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 800 may also include an input/output controller 830 to receive input and output requests from at least one central processor 802, and then send device-specific control signals to the device they control. The input/output controller 830 may free at least one central processor 802 from having to deal with the details of controlling each separate kind of device.

The term "computer-readable storage medium" used herein may include any tangible medium that is capable of storing or encoding a set of instructions for execution by a computer that cause the computer to perform any one or more of the methods described herein. The term "computer-readable storage medium" used herein may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for identifying citations from documents and constructing enriched citation databases, the method comprising:

obtaining, by a processing device, a document comprising texts of a natural language;

constructing pre-processing filters comprising a first set of regular expressions matching non-citation text patterns;

applying the pre-processing filters to the document to generate a pre-processed document by removing the non-citation text patterns from the document;

constructing citation filters comprising a second set of regular expressions, wherein each of the second set of regular expressions matches at least one of a corresponding citation or a context associated with the citation, and a regular expression in the first set of regular expressions or in the second set of the second set of regular expressions is one of an atomic regular expression or a compound regular expression defined by one or more atomic regular expressions or other compound regular expressions;

applying the citation filters to the pre-processed document to identify one or more citations and corresponding contexts that match at least one of the second set of regular expressions; and storing the one or more citations and corresponding contexts in an enriched citation database.

2. The method of claim 1, further comprising:

determining whether each of the one or more identified citations is a full citation, a short citation, or an immediately preceding citation; and responsive to determining that at least one of the identified citations is the short citation or the immediately preceding citation, converting the at least one of the identified citations into a corresponding full citation, and storing the corresponding full citation in the enriched citation database.

3. The method of claim 2, wherein determining whether each of the one or more identified citations is a full citation, a short citation, or an immediately preceding citation is based on a full citation including two party name text patterns, a short citation including only one party name text pattern, and an immediately preceding citation not including any party name text patterns.

4. The method of claim 1, wherein storing the one or more citations and corresponding contexts in the citation database further comprises:

storing each of the one or more citations and corresponding contexts in an entry of the citation database according to a schema, wherein the entry comprises at least one of an identification of a citing document, an identification of a cited document, a form of the citation, a verbose citation title, a short citation title, a citation reporter, a citation court and year, a citation sequence number, or a citation context.

5. The method of claim 4, wherein the citation context comprises at least one of a proposition text pattern or an explanation text pattern associated with the corresponding citation in the entry.

6. The method of claim 5, wherein the proposition text pattern comprises a sentence preceding the corresponding citation in the document and the explanation text pattern comprises a sentence following the corresponding citation in the document in between a pair of parentheses.

7. The method of claim 4, wherein storing the one or more citations and corresponding contexts in the citation database further comprises:

storing the one or more citations as a sequential list of entries according to an order of identification of the one or more citations in the document, wherein each one of the list entries is a tuple, and at least one of the list of tuples comprise a short citation and a corresponding full citation or an immediately preceding citation and the corresponding full citation.

8. The method of claim 7, wherein each tuple comprises a corresponding index number according to the order of each tuple in the sequential list and converting the at least one of the identified citations into a corresponding full citation comprises converting an immediately preceding citation into a corresponding full citation by copying the full citation from the tuple with the previous index number or converting a short citation into a corresponding full citation by copying the full citation from a tuple with a previous index number based on the full citation including the short citation.

9. The method of claim 1, wherein access to the citation database is provided to at least one of a machine learning module, a legal document search engine or a legal claim valuation engine.

10. A system for identifying citations from documents and constructing an enriched citation database, the system comprising a citation database and a processing device to:

obtain a document comprising texts;

construct pre-processing filters comprising a first set of regular expressions matching non-citation text patterns;

apply the pre-processing filters to the document to generate a pre-processed document by removing the non-citation text patterns from the document;

construct citation filters comprising a second set of regular expressions, wherein each of the second set of regular expressions matches at least one of a corresponding citation or a context associated with the citation, and a regular expression in the first set of regular expressions or in the second set of the second set of regular expressions is one of an atomic regular expression or a compound regular expression defined by one or more atomic regular expressions or other compound regular expressions;

apply the citation filters to the pre-processed document to identify one or more citations and corresponding contexts that match at least one of the second set of regular expressions; and store the one or more citations and corresponding contexts in a citation database.

11. The system of claim 10, wherein the processing device is further to:

determine whether each of the one or more identified citations is a full citation, a short citation, or an immediately preceding citation; and based on a determination that at least one of the identified citations is the short citation or the immediately preceding citation, convert the at least one of the identified citations into a corresponding full citation, and storing the corresponding full citation in the citation database.

12. The system of claim 11, wherein the processing device is further to determine whether each of the one or more identified citations is a full citation, a short citation, or an immediately preceding citation is based on a full citation including two party name text patterns, a short citation including only one party name text pattern, and an immediately preceding citation not including any party name text patterns.

13. The system of claim 10, wherein to store the one or more citations and corresponding contexts in the citation database, the processing device is further to:

store each of the one or more citations and corresponding contexts in an entry of the citation database according to a schema, wherein the entry comprises at least one of an identification of a citing document, an identification of a cited document, a form of the citation, a verbose citation title, a short citation title, a citation reporter, a citation court and year, a citation sequence number, or a citation context.

14. The system of claim 13, wherein the citation context comprises at least one of a proposition text pattern or an explanation text pattern associated with the corresponding citation in the entry.

15. The system of claim 14, wherein the proposition text pattern comprises a sentence preceding the corresponding citation in the document and the explanation text pattern comprises a sentence following the corresponding citation in the document in between a pair of parentheses.

16. The system of claim 13, wherein to the one or more citations and corresponding contexts in the citation database, the processing device is further to:

store the one or more citations as a sequential list of entries according to an order of identification of the one or more citations in the document, wherein each one of the list entries is a tuple, and at least one of the list of tuples comprise a short citation and a corresponding full citation or an immediately preceding citation and the corresponding full citation.

17. The system of claim 16, wherein each tuple comprises a corresponding index number according to the order of each tuple in the sequential list and converting the at least one of the identified citations into a corresponding full citation comprises converting an immediately preceding citation into a corresponding full citation by copying the full citation from the tuple with the previous index number or converting a short citation into a corresponding full citation by copying the full citation from a tuple with a previous index number based on the full citation including the short citation.

18. A machine-readable non-transitory storage media encoded with instructions that, when executed by one or more processing devices, cause the one or more processing devices to:
- obtain a document comprising texts;
- construct pre-processing filters comprising a first set of regular expressions matching non-citation text patterns;
- apply the pre-processing filters to the document to generate a pre-processed document by removing the non-citation text patterns from the document;
- construct citation filters comprising a second set of regular expressions, wherein each of the second set of regular expressions matches at least one of a corresponding citation or a context associated with the citation, and a regular expression in the first set of regular expressions or in the second set of the second set of regular expressions is one of an atomic regular expression or a compound regular expression defined by one or more atomic regular expressions or other compound regular expressions;
- apply the citation filters to the pre-processed document to identify one or more citations and corresponding contexts that match at least one of the second set of regular expressions; and
- store the one or more citations and corresponding contexts in a citation database.

* * * * *